United States Patent [19]

Stober et al.

[11] Patent Number: 4,758,282

[45] Date of Patent: Jul. 19, 1988

[54] PROCESS FOR DRY CATIONIZATION OF GALACTOMANNANS

[75] Inventors: Reinhard Stober, Hasselroth; Wolfgang Fischer, Kahl; Michael Huss, Eschborn, all of Fed. Rep. of Germany

[73] Assignee: Degussa Aktiengesellschaft, Frankfurt, Fed. Rep. of Germany

[21] Appl. No.: 947,180

[22] Filed: Dec. 29, 1986

[30] Foreign Application Priority Data

Feb. 15, 1986 [DE] Fed. Rep. of Germany ....... 3604795

[51] Int. Cl.$^4$ ................... C13K 13/00; C07G 17/00; C07G 15/04
[52] U.S. Cl. ..................................... 127/34; 536/124; 536/114; 536/52; 536/120; 162/178
[58] Field of Search ................. 127/34; 536/124, 114, 536/52, 120; 162/178

[56] References Cited

U.S. PATENT DOCUMENTS 3,823,100 7/1974 Rothwell et al. ................. 536/114
4,004,977 1/1977 Kato et al. ............................ 127/34

FOREIGN PATENT DOCUMENTS 1212573 10/1986 Canada .
 130946  6/1984 European Pat. Off. .
 146911 12/1984 European Pat. Off. .
 0164301  9/1984 Japan .................................. 536/124
1136842 12/1968 United Kingdom .
2142636  1/1985 United Kingdom .

Primary Examiner—Helen M. S. Sneed
Assistant Examiner—Chung K. Pak
Attorney, Agent, or Firm—Beveridge, DeGrandi & Weilacher

[57] ABSTRACT

A process for the dry cationization of galactomannans by reaction with alkylidene epoxides in an alkaline medium in the presence of water at 5° to 60° C. and in the presence of finely divided, hydrophilic silicic acid.

7 Claims, No Drawings

PROCESS FOR DRY CATIONIZATION OF GALACTOMANNANS

The invention relates to a dry process for the production of cationic galactomannans by reaction with alkylidene epoxides in the presence of water in an alkaline medium.

Galactomannans are an important group of plant-derived hydrocolloids, which are present as storage carbohydrates, like starch, especially in the seed endosperm of many legumes. However, only guaran (guar gum) and carubin (carob flour) have practical industrial importance. Guaran is found in the endosperm of guar seeds (*Cyamopsis tetragonoloba L.*), which is a legume in the Papilionaceae family. Guar is an old cultivated plant, which is grown today on a large scale mainly in India, Pakistan and Texas.

Guaran contains 64% mannose and 36% galactose. The mannose units, linked by beta-(1,4)-glycosidic bonds, form long, straight chains, to which individual galactose molecules are attached by alpha-(1,6) linkages. Both mannose and galactose are found in the pyranose form. The average molecular weight of guaran is approximately 220,000. Guaran is soluble in cold water.

Native and modified galactomannans based on guar flour and carob flour are employed today in highly diverse fields in the industry. Thus, for example, they are used in the petroleum, textile, paper, food, pharmaceutical, cosmetic, and explosives industries, as well as in mining and in water conditioning. In paper manufacture, the native galactomannans have been known for years as "wet end additives" to increase paper strength. The properties of products can be enhanced by modification, or products are developed with completely new properties.

The possibility of cationizing galactomannans can be used to improve the natural affinity of galactomannans for cellulose and thereby to achieve better retention of fibrils.

European patent EP-A No. 0146911 teaches a process in which 2,3-epoxypropyltrimethylammonium chloride is reacted in an aqueous alkaline medium at 52° C.

According to European patent EP-A No. 0130946, this reaction can also be run in an alkaline medium which, however, also contains tetraborate and is partially neutralized by acetic acid before the addition of the cationization reagent.

British patent GB-PS No. 1 136 842 provides more detailed information on products, obtained by reacting 2,3-epoxypropyltrimethylammonium chloride with galactomannans in an aqueous alkaline medium.

According to these printed publications, the cationized product must be dried before further use, then ground, and screened.

The object of the invention is a process for the production of cationized galactomannans, during a process in which energy for mixing is to be used only briefly, and the cationized galactomannans can be further processed with additional secondary treatment (screening, drying, etc.).

According to a feature of the invention, there is provided a process for dry cationization by reacting galactomannans with alkylidene epoxides in an alkaline medium in the presence of water, wherein the reaction is carried out at 5° to 60° C. in the presence of finely divided silicic acid. The pH of a thusly modified galactomannan is approximately ≧9 (1 weight % solution).

Native or modified galactomannans or galactomannan-containing substances of any origin can be employed for the production of cationic galactomannans according to the process of this invention. Native guar flour is especially advantageous.

According to the invention, the etherification of galactomannans is carried out with alkylidene epoxides of the general formula:

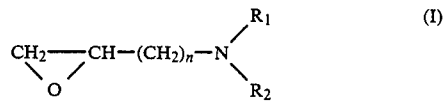

or preferably

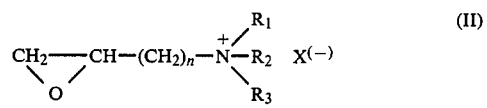

in which n is a number from 1 to 3, and $R_1$, $R_2$, and $R_3$ are identical or different alkyl residues with 1 to 4 carbon atoms, or $R_1$ is benzyl and $X^-$ stands for chloride, bromide, sulfate, or acetate. Preferably 2,3-epoxypropyltrimethylammonium chloride is used.

In another embodiment of the present invention, the above reaction with the above-mentioned epoxides is carried out in the presence of 0.5 to 5 weight % of a compound, which is represented by one of the following formulae:

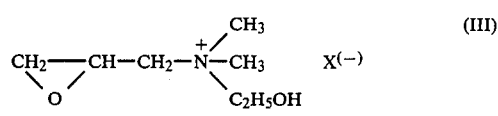

or

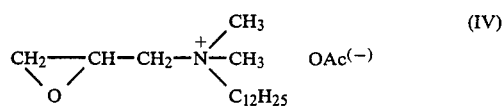

or

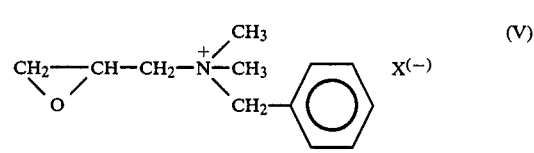

Preferably, these compounds are employed in a mixture with the epoxides of formula (I) or (II), and can also be present therein in the form of the corresponding chlorohydrins.

The conversion to epoxides corresponding to formulae (III) to (V), which react with the galactomannans, then occurs at the very latest in the reaction medium. Advantageously, mixtures of this kind are produced in the course of preparing epoxides of formulae (I) and (II) as described, for example, in U.S. Pat. No. 3,315,782; by using the required amounts of the corresponding tertiary amines for the production of the epoxide components with formulae (III) to (V).

These epoxides or chlorohydrins, however, can also be synthesized separately and combined with the epoxides of formulae (I) or (II) in the required ratio.

In general, it is advisable to use approximately 0.005 to 0.5 mol of epoxide, preferably 0.05 to 0.30 mol of epoxide, for each mol of galactomannan, calculated in terms of anhydroglucose units (MW 162.15) in the dry matter.

The specific surface area of the finely divided silicic acids (silica) employed ranges from 60 to 700 m$^2$/g, preferably 100 to 450 m$^2$/g (BET measurement according to DIN 66131, N-2- adsorption at the temperature of the liquid nitrogen, sample heated beforehand at 110° C.).

The silicas are employed in an amount of 0.1 to 3.0, preferably 1.0 to 2.0, weight %, based on (absolutely dry) galactomannan.

Preferably, hydrophilic precipitated silicic acids are employed having a specific surface of 190 to 450 m$^2$/g, especially spray-dried precipitated silicic acid with a specific surface of 190 m$^2$/g. These products and their method of manufacture are known in the art. Many suitable synthetic silicas are suitable for this purpose.

According to the invention, the reaction mixture contains a hydroxide or oxide acting as alkali, especially an alkali metal hydroxide or alkaline earth metal hydroxide or oxide, especially calcium hydroxide or calcium oxide, in an amount of 0.5 to 5.0 weight %, especially 1.0 to 3.0 weight % and 10 to 60 weight %, preferably 20 to 30 weight %, of water, all values being based on the amount of (absolutely dry) galactomannan employed.

In an especially suitable embodiment, calcium hydroxide or calcium oxide is used in the form of a powdery mixture with finely divided, hydrophilic silicic acid (hereinafter referred to as "activator").

The activator consists of 10 to 50 weight % of silicic acid and 90 to 50 weight % of calcium hydroxide or calcium oxide.

The process embodying the invention is carried out such that the mixture of galactomannan, alkali or alkaline earth hydroxide or oxide, silicic acid, and alkylidene epoxide, which is generally employed as an aqueous solution, is homogenized in an intensive mixer. Any suitable intensive mixer can be used for this purpose in order to provide a zone of high intensity mixing.

For practical reasons, the epoxide solution is finely divided, added to the galactomannan available in the trade with a water content of about 7 to 15 weight %, and preferably sprayed.

The oxide or hydroxide acting as alkali and the silicic acid can be added before or after the galactomannan.

The powdery activator is preferably combined with the galactomannan before the addition of the epoxide solution.

If the aqueous solution of, e.g., an alkali hydroxide is employed, the epoxide solution and the alkaline components are preferably added to the mixer unit at the same time, which is an option that naturally also applies to the powdery alkaline earth metal oxide or hydroxide.

The mixture obtained when producing the epoxide by reaction of the corresponding halohydrin with substances acting as alkali, such as, for example, alkali hydroxide, can be used immediately, if the resulting alkali halogenide does not affect the final product (risk of corrosion). This final product is neither washed nor neutralized and can be used directly.

The cationization reaction can proceed both in the mixer unit or also after homogenization, outside in a storage silo or in the suitable packages provided for shipment.

If the reaction is to proceed in the mixer unit, yields of 40–60% are obtained after 6 to 24 hours at 30 to 60° C.

However, in the preferred embodiment the process is such that the reaction mixture is homogenized at 5 to 40° C. in the intensive mixer within 10 seconds to 25 min, the mixture is then transferred out of the mixing zone and the cationization reaction is allowed to proceed to completion at the same temperatures in the storage bin provided therfor, such as, for example, a silo.

The broad range of temperature is 5° to 60° C. for the process of the invention.

In this case, it has proven advantageous to run the process preferably within the temperature range in which the room temperature of ordinary storehouses varies as a function of, for example, seasonally adjusted fluctuations of ambient temperature, i.e., from 18° to 30° C., especially 20° to 25° C.

The cationic galactomannans produced according to the process of the invention are generally available as a fine dry powder and can be used directly after the reaction.

Especially suitable as intensive mixers, are for example, plowshare mixers with at least one, preferably several blades, for a batch or continuous mode of operation or wetting flow mixers especially for continuous operation.

It has been found that additional reaction vessels are unnecessary according to the invention, because the reaction mixture can be placed directly in the packages provided for shipment or in a storage silo after the intimate mixing and this mixture finishes reacting during storage.

At the same time, the low residence time in the mixer unit enables the continuous execution of the dry cationization, whereas in the prior art only batch cationization was known and practical because of the long mixing times.

The cationic galactomannans as taught by the invention are suitable as charging material in mining and in water conditioning, in addition to application in the petroleum, textile, pharmaceutical, cosmetic, and explosives industries.

The employment of cationic galactomannans (mainly guar) in the paper industry is especially advantageous. In this case, there are positive effects on bursting pressure, breaking length, layer strength, retention, sheet formation, and the distribution of fibers in paper manufacture.

In contrast to natural guar, cationic guar is more easily dispersed and has a lower tendency for dehydration related problems on the wire. During paper manufacture the pulp is also more readily ground after addition of cationic guar. Cationic guar is also suitable as a dehydration agent and as drying accelerator.

The following types of activators are used in the cationization of guar (guaran).

| Type | Formulation (Weight %) | Bulk Density (g/cm$^3$) |
| --- | --- | --- |
| PC-1 | 52% calcium hydroxide (97%) 48% (spray-dried silicic acid | 0.18 |

-continued

| Type | Formulation (Weight %) | Bulk Density (g/cm³) |
|---|---|---|
| PC-2 | 190 m²/g) silica<br>75% calcium hydroxide (97%)<br>25% silica | 0.25 |
| PC-3 | 67% calcium hydroxide (97%)<br>33% silica | 0.22 |
| PC-4 | 90% calcium hydroxide (97%)<br>10% silica | 0.30 |

The analytical values were obtained with the use of rinsed samples (isopropanol/water 80/20 weight %).

All percentages in the examples are based on weight %.

The viscosities were determined with a Brookfield viscometer at 25° C. and 100 rpm.

A spray-dried, hydrophilic silicic acid with a specific surface of 190 m²/g (BET) was used as the silicic acid in all examples.

EXAMPLES

Example 1—(guar, high-viscosity, theoretical degree of substitution 0.20)

50 kg (0.2726 kmol) of natural guar (water content 11.6%, content of insoluble nitrogen 0.693%) is placed in a plowshare mixer equipped with one blade. After the addition of 1.768 kg of activator PC-2, the mixture is mixed for 5 min. and 21.290 kg of reagent solution, which contains 8.264 kg of 2,3-epoxypropyltrimethylammonium chloride, is charged through a nozzle with the mixer running over a 5 min. period. The mixture is mixed for another 10 min. and loaded into a storage bin. After a standing time of 5 days at 20° C., a total nitrogen content of 1.695% was found upon analysis (washed-out guar). This corresponds to a degree of substitution of 0.130 and a yield of 65.1%. The viscosity of a 1 weight % guar paste was 880 mPa.s (measured in a Brookfield viscometer after 5 min. at 25° C. and 100 rpm).

Example 2—(guar, low-viscosity, theoretical degree of substitution 0.20)

50 kg (0.2738 kmol) of natural guar (water content 11.2%, content of insoluble nitrogen 0.607%) is placed in a plowshare mixer, and combined with 1.776 kg of activator PC-2 for 5 min. 22.790 kg of reagent solution (content: 8.304 kg of 2,3-epoxypropyltrimethylammonium chloride) is charged through a nozzle over a 5 min. period; the mixture is mixed for another 10 min. and loaded into a storage bin. After a storage time of 5 days at 20° C., a total nitrogen content of 1.718% was determined. The degree of substitution of 0.138 obtained corresponds to a yield of 69.1% for.the cationization reaction. The viscosity of a 1 weight % guar paste was 24 mPa.s (Brookfield viscometer after 5 min. at 25° C. and 100 rpm).

Example 3

This exmaple was carried out as in Example 1, but the theoretical degree of substitution is 0.10.
Batch concentration: 68% absolutely dry guar and 25% water
Activator: 4% PC-2, 2,3-epoxypropyltrimethylammonium chloride (72%); 5 days 20° C.;
Total nitrogen: 1.236%; pract. degree of substitution=0.067
Yield: 66.8%; viscosity=640 mPa.s.

Example 4

This example was carried out as in Example 1, but the theoretical degree of substitution is 0.40.
Batch concentration: 53% absolutely dry guar and 25% water
Activator: 4% PC-2, 2,3-epoxypropyltrimethylammonium chloride (72%); 5 days 20° C.;
Total nitrogen: 2.377% pract. degree of substitution=0.239
Yield: 59.6%; viscosity=870 mPa.s.

EXAMPLE 5

A theoretical degree of substitution 0.20 as in Example 1, but different reaction temperatures.
Batch concentration: 61% absolutely dry guar and 25% water
Activator: 4% PC-2, 2,3-epoxypropyltrimethylammonium chloride (72%)
(a) Reaction time:
14 days at 5° C.
Total nitrogen=1.515%
Pract. degree of substitution=0.1045
Yield=52.3%
Viscosity=920 mPa.s.
(b) Reaction time:
24 hours at 50° C.
Total nitrogen=1.566%
Pract. degree of substitution=0.112
Yield=55.8%
Viscosity=940 mPa.s.

Example 6

A theoretical degree of substitution 0.20 as in Examolel 1, but with sodium hydroxide solution.
Batch concentration: 61% absolutely dry guar and 25% water
Activator:
2% NaOH; 1% silicic acid;
2,3-epoxypropyltrimethylammonium chloride (72%); 5 days at 20° C.
Total nitrogen=1.591%
Practical degree of substitution=0.115
Yield=57.6%
Viscosity=760 mPa.s.

Example 7

A theoretical degree of substitution 0.20 as in Example 1, but with sodium hydroxide powder.
Batch concentration: 61% absolutely dry guar and 25% water; 2,3-epoxypropyltrimethylammonium chloride (72%); 5 days at 20° C.;
Activator: 2% NaOH; 1% silicic acid added separately
Total nitrogen=1.651%
Practical degree of substitution=0.124
Yield=61.9%
Viscosity=164 mPa.s.

Example 8

A theoretical degree of substitution 0.20 as in Example 2, but with 1.326 kg of activator PC-3 (≙3 weight %).
Batch concentration: 61% absolutely dry guar and 25% water; 2,3-epoxypropyltrimethylammonium chloride, 72%; 5 days at 20° C.
Total nitrogen=1.725%
Practical degree of substitution≙0.147;

Yield=73.7%;
Viscosity=25 mPa.s.

Example 9

A theoretical degree of substitution 0.20 as in Example 2, but with 0.888 kg of activator PC-1 ($\triangleq$2 weight %).
Batch concentration: 61% absolutely dry guar and 25% water (2,3-epoxypropyltrimethylammonium chloride, 72%); 7 days at 20° C.
Total nitrogen=1.619%;
Practical degree of substitution=0.132;
Yield=65.8%;
Viscosity=25 mPa.s.

Example 10

A theoretical degree of substitution 0.20 as in Example 2, but with 1.510 kg of activator PC-4 ($\triangleq$3.4 weight %) and batch concentration: 64% absolutely dry guar.
Batch concentration: 64% absolutely dry guar and 23% water; (2,3-epoxypropyltrimethylammonium chloride, 72%); 5 days at 20° C.
Total nitrogen=1.705%;
Practical degree of substitution=0.1444;
Yield=72.2%;
Viscosity=22 mPa.s.

Example 11

A theoretical degree of substitution 0.20 as in Example 2, but with batch concentration 58% absolutely dry guar.
Batch concentration: 58% absolutely dry guar and 30% water (2,3-epoxypropyltrimethylammonium chloride, 72%); 5 days at 20° C.
Activator: 4% PC-2
Total nitrogen=1.743%;
Practical degree of substitution=0.150;
Yield=75.0%;
Viscosity=19 mPa.s.

Example 12

A theoretical degree of substitution 0.20 as in Example 2, but with cationization reagent 15.847 kg of 3-chloro-2-hydroxypropyltrimethylammonium chloride, 65%, activated beforehand with NaOH+4.381 kg of NaOH, 50%,+2.562 kg of water.
Batch concentration: 55% absolutely dry guar and 25% water 5 days at 20° C.;
Activator: 4% PC-2;
Total nitrogen=1.546%;
Practical degree of substitution=0.121;
Yield=60.5%;
Viscosity=25 mPa.s.

Example 13

A theoretical degree of substitution 0.20 as in Example 2, but with cationization reagent 15.847 kg of 3-chloro-2-hydroxypropyltrimethylammonium chloride, 65%, stoichiometric amount of calcium hydroxide admixed in addition+6.943 kg of water, 2.092 kg of calcium hydroxide, 97% admixed in addition.
Batch concentration: 58% absolutely dry guar and 25% water 5 days at 20° C.;
Activator: 4% PC-2;
Total nitrogen=1.323%;
Practical degree of substitution=0.078;
Yield=38.8%;
Viscosity=24 mPa.s.

Further variations and modifications will become apparent to those skilled in the art and are intended to be encompassed by the claims appended hereto.

We claim:

1. A process for the dry cationization of galactomannans comprising reacting a mixture of galactomannan, an alkylidene epoxide and an alkaline reacting hydroxide or oxides selected from the group consisting of alkali metal hydroxides, alkaline earth metal hydroxides and alkaline earth metal oxides in the presence of water, at 5° to 60° C. in the presence of 0.1 to 3% by weight, of a finely divided silica, based on dry galactomannan, in an intensive mixer, wherein the alkyldiene epoxide is represented by the formula:

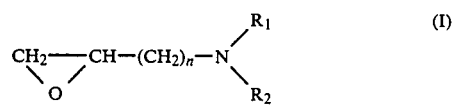

or

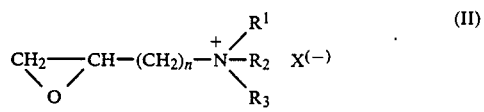

in which n=1,2 or 3, $R_2$ and $R_3$ are identical or different alkyl groups with 1 to 4 carbon atoms, $R_1$ is the benzyl residue or an alkyl group with 1 to 4 carbon atoms, which is different from or identical to $R_2$ and $R_3$, and X(—) is chloride, bromide, sulfate or acetate.

2. The process according to claim 1, wherein said mixture of a galactomannan, said alkaline reacting hydroxide or oxide, silica, and said alkylidene epoxide is homogenized in an intensive mixer for 20 seconds to 25 minutes, and then the resultant homogenized mixure is transferred out of said mixer to a storage tank for completion of the cationization.

3. The process according to claim 1, wherein said cationization is carried out in the presence of 0.5 to 5 weight %, based on the epoxide of formula (I) or (II), of an additional epoxide, represented by the formula:

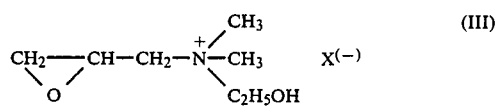

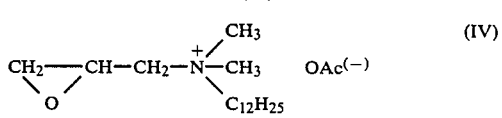

or

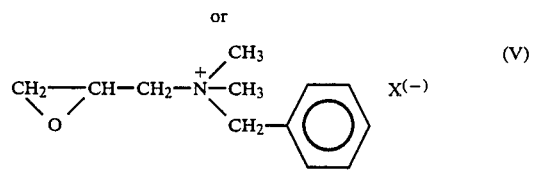

with X(—) being chloride, bromide, sulfate or acetate and Ac being acetate.

4. The process according to claim 1, wherein said silica and said alkaline reacting hydroxide or oxide are employed as a powdery premixture.

5. The process according to claim 1, wherein said finely divided silica is hydrophilic.

6. The process according to claim 1, wherein said intensive mixer is a plowshare mixer with at least one blade or a wetting flow mixer.

7. The process according to claim 1, wherein the finely divided silica is a synthetic silica.

* * * * *